United States Patent [19]

Raghuram et al.

[11] Patent Number: 4,903,327
[45] Date of Patent: Feb. 20, 1990

[54] CELLULAR TELEPHONE WITH TRANSMISSION-ON AND RADIO-ON TIMERS

[75] Inventors: Sharada Raghuram, Darien; Gary J. Pregont, Elgin; Les Updegrove, Schaumburg; Thomas R. Klaus, Palatine, all of Ill.

[73] Assignee: Motorola, Inc., Schaumburg, Ill.

[21] Appl. No.: 306,592

[22] Filed: Feb. 3, 1989

[51] Int. Cl.⁴ .......................................... H04B 17/00
[52] U.S. Cl. ..................................... 455/127; 455/115; 455/117; 455/343
[58] Field of Search ............... 455/127, 115, 117, 343; 379/58, 63; 340/825.06, 825.17

[56] References Cited

U.S. PATENT DOCUMENTS 4,726,052  2/1988  Kato et al. ........................... 455/127
4,761,824  8/1988  Saito ................................... 455/127

FOREIGN PATENT DOCUMENTS 0038627  2/1987  Japan ................................. 455/127

*Primary Examiner*—Joseph A. Orsino
*Assistant Examiner*—Kinfe-Michael Negash
*Attorney, Agent, or Firm*—Rolland R. Hackbart

[57] ABSTRACT

A radio-on timer and transmission-on timer of a cellular telephone (100) provide an accurate record of the total amount of time since manufacture that the cellular telephone (100) and its transmitter (160), respectively, have been turned on for the purpose of measuring the in-field reliability thereof. The cellular telephone (100) includes a processor (110) that is responsive an interrupt signal (117) for incrementing and storing an interrupt timer, the radio-on timer and the transmission-on timer in a volatile memory 114. When the processor (110) senses that power has been switched off, the processor (110) reads out from the volatile memory (114) the radio-on timer and transmission-on timer, reads out from the non-volatile memory (112) the previously stored radio-on timer and transmission-on timer, adds them together and stores the summed radio-on timer and transmission-on timer back in the non-volatile memory (112). The unique radio-on and transmission-on timers of the present invention may be advantageously utilized in any radio including a transmitter.

4 Claims, 2 Drawing Sheets

CELLULAR TELEPHONE WITH TRANSMISSION-ON AND RADIO-ON TIMERS

BACKGROUND OF THE INVENTION

The present invention is generally related to radio transceivers and more particularly to an improved transmission-on and radio-on timers for cellular telephones.

In today's market for cellular telephones, reliability is of critical importance. Many methods exist to theoretically estimate or calculate inherant reliability of cellular telephones. However, there is no practical way of determining the actual reliability of cellular telephones in the field without extensive and costly field trials. Accordingly, there is a need for an improved process and apparatus for measuring the actual reliability of cellular telephones in the field.

OBJECTS OF THE INVENTION

It is an object of this invention to provide a record of the total amount of time a radio has been turned on for the purpose of measuring the in-field reliability thereof.

It is another object of this invention to provide a record of the total amount of time that a radio transmitter has been turned on for the purpose of measuring the in-field reliability thereof.

DESCRIPTION OF THE PREFERRED EMBODIMENT

Figure 1:
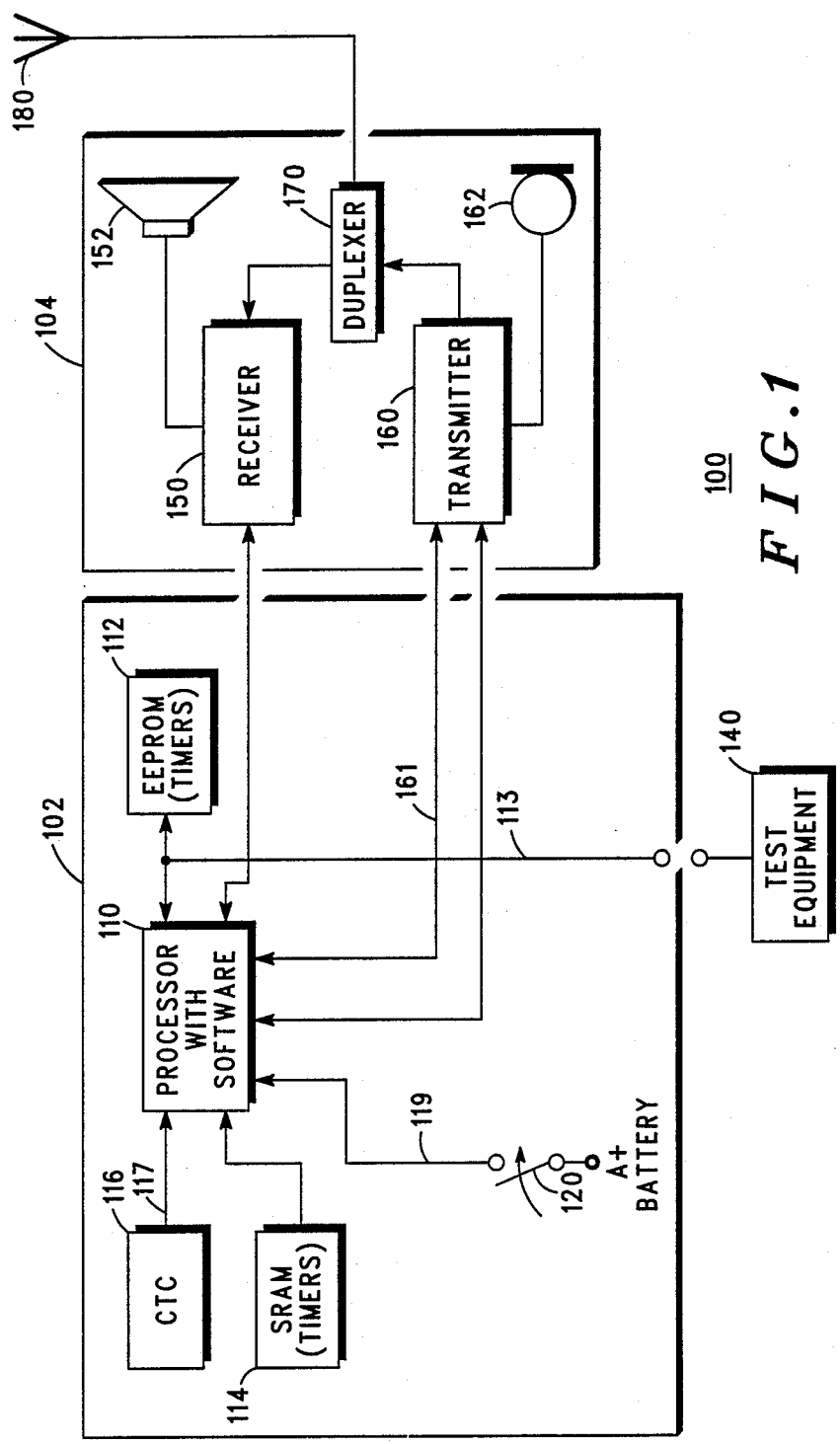
FIG. 1 is a block diagram of a cellular telephone embodying the present invention.

FIG. 1 shows a block diagram for a cellular telephone 100, which may be a mobile, transportable or portable telephone. Cellular telephone 100 may be any conventional cellular telephone such as, for example, the cellular telephone shown and described in Motorola instruction manual number 68P81049E55, entitled "DYNA-TAC Cellular Mobile Telephone", published by and available from Motorola C & E parts, 1313 East Algonquin Road, Schaumburg, Ill. 60196. Cellular telephone 100 includes RF section 104 with receiver 150, speaker 152, transmitter 160, microphone 162, duplexer 170 and antenna 180, and digital section 102 with processor 110, non-volatile electrically-erasable programmable memory (EEPROM) 112, volatile static random-access memory (SRAM) 114, and counter-timer chip (CTC) 116. Cellular telephone 100 is also coupled to battery voltage A+ from an internal or external battery (not shown).

Figure 2:
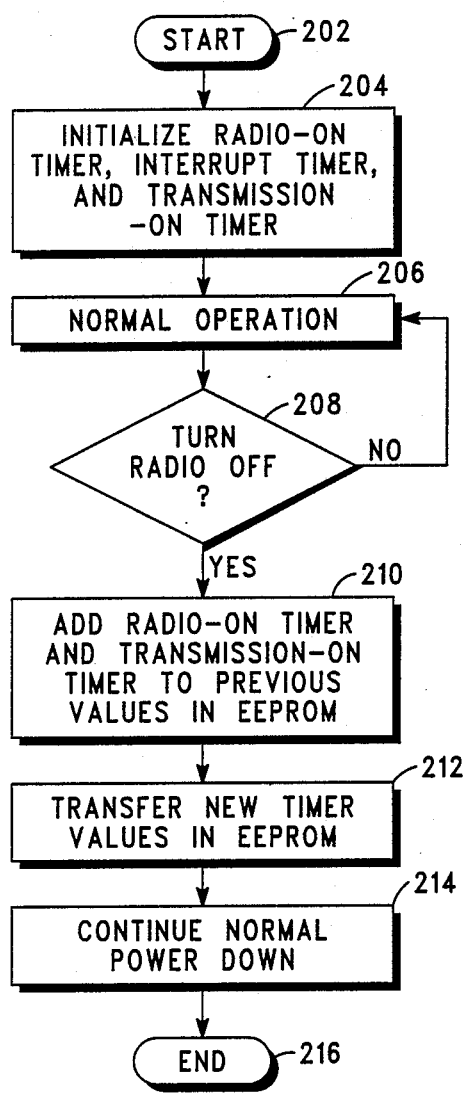
FIG. 2 is a flow chart for the power-on/power-down routine used by the cellular telephone in FIG. 1.

When cellular telephone 100 is turned on, three timers, the interrupt timer, radio-on timer and transmission-on timer, in SRAM 114 are initialized to zero by the power-on/power-down routine in FIG. 2. The interrupt timer accumulates time in milliseconds, the radio-on timer in seconds and minutes, and transmission-on timer in seconds and minutes. The foregoing operation is illustrated by the routine in FIG. 2.

Referring to FIG. 2, processor 110 enters the power-on/power-down routine at start block 204 when cellular telephone 100 is turned and proceeds to block 204, where the interrupt timer, radio-on timer and transmission-on timer are initialized to zero. Next, at block 206, normal operation of cellular telephone 100 continues. Periodically, a check is made at decision block 208 to determine if cellular telephone 100 has been turned off. Cellular telephone 100 monitors the ON/OFF SENSE signal to determine when ignition switch 120 is opened turning it off. If cellular telephone has not been turned off, NO branch is taken from decision block 208 back to block 206 to continue normal operation.

Figure 3:
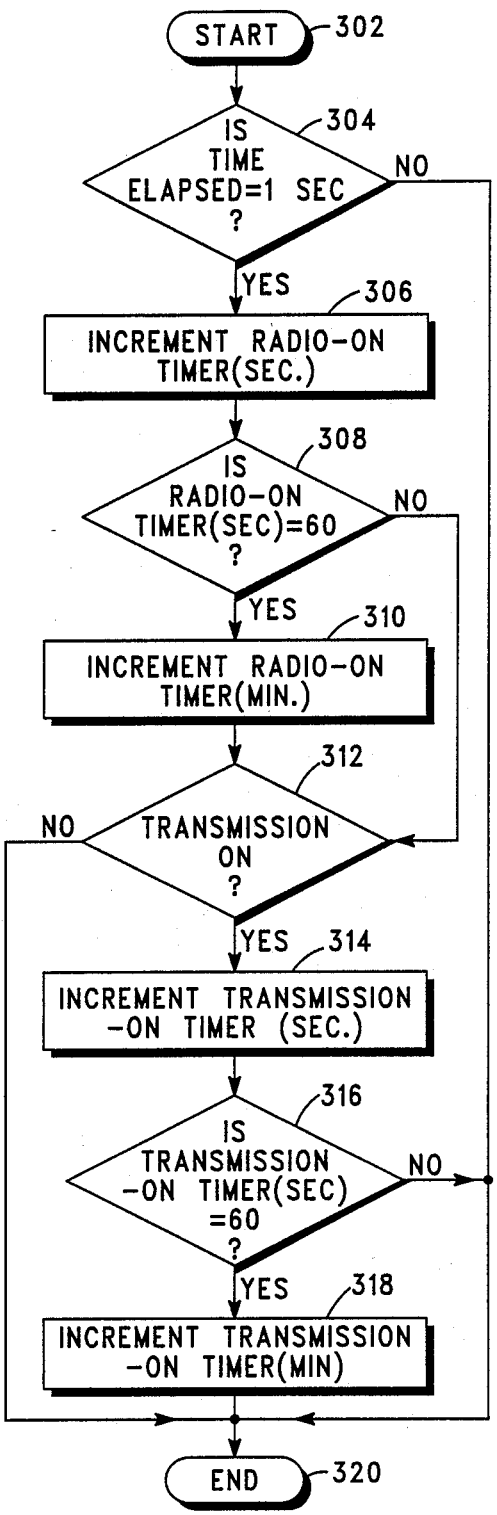
FIG. 3 shows the flow chart for the timer-update routine used by the cellular telephone in FIG. 1.

Based on an interrupt signal 117 generated by CTC (116), the timer-update routine in FIG. 3 is executed by processor 110 for incrementing the interrupt timer, radio-on timer and transmission-on timer in SRAM 114. In the preferred embodiment of the present invention, the timer-update routine runs every one-hundred milliseconds.

Referring to FIG. 3, in response to the interrupt signal, processor 110 increments the interrupt timer by one-hundred milliseconds and enters the timer-update routine at start block 302 and proceeds to decision block 304 to determine if one second of on-time has elapsed. Processor 102 monitors interrupt timer to determine when one second of on-time has elapsed. If one second of on-time has not elapsed, NO branch is taken to exit at end block 320. If one second of on-time has elapsed, YES branch is taken from decision block 304 to block 306 where the radio-on timer in seconds in SRAM 114 is incremented by one second.

Next, at decision block 308, a check is made to determine if the radio-on timer in seconds has reached sixty seconds. Note that the radio-on timer has two portions, one portion kept in seconds and another portion kept in minutes. If so, YES branch is taken to block 310, where the radio-on timer in minutes in incremented by one. If the radio-on timer in seconds has not reached sixty seconds, NO branch is taken to decision block 312.

Next, decision block 312 is entered from either block 310 or NO branch of decision block 308. At decision block 312, a check is made to determine if the TX KEY signal 161 is on to enable transmitter 160. If not, NO branch is taken to exit at end block 320. If the TX KEY signal 161 is on to enable transmitter 160, YES branch is taken to block 314, where the transmission-on timer in seconds in SRAM 114 is incremented by one second.

Next, at decision block 316, a check is made to determine if the transmission-on timer in seconds has reached sixty seconds. Note that the transmission-on timer has two portions, one portion kept in seconds and another portion kept in minutes. If so, YES branch is taken to block 318, where the transmission-on timer in minutes in incremented by one and thereafter processor exits at end block 320. If the transmission-on timer in seconds has not reached sixty seconds, NO branch is taken from decision block 316 to exit at end block 320. The routines in FIG. 3 is repeated as long as cellular telephone 100 remains on.

Just before cellular telephone 100 is turned off, the values of the radio-on and transmission-on timers are stored in non-volatile EEPROM 112. This is necessary since SRAM 114 is a volatile memory which does not retain information stored therein when it is powered down. The EEPROM values for the radio-on and transmission-on timers are initialized to zero at the time of production of cellular telephone 100. Referring back to FIG. 2, processor 102 monitors the ON/OFF SENSE signal 119 at decision block 208 to determine when the ignition switch 120 has been turned off. If so, YES branch is taken to block 210, where processor 102 reads the stored values for the radio-on and transmission-on timers from EEPROM 112. In the preferred embodiment of the present invention, the radio-on and transmission-on timers are stored in EEPROM 112 in minutes. Then, the values of the radio-on and transmission-on timers in SRAM 114 are read and added to the corresponding values read from EEPROM 112. Next, at block 212, the updated values of the radio-on and transmission-on timers are stored back in EEPROM 112. Thereafter, at block 214, processor 102 continues its normal power down and exits at end block 216. The next time cellular telephone 100 is turned on, the routines in FIGS. 2 and 3 are repeated.

According to a feature of the present invention, the values of the radio-on and transmission-on timers stored in EEPROM 112 can be read out via bus 113 by an external piece of test equipment 140. The values of the radio-on and transmission-on timers represent the total time since manufacture of cellular telephone 102 that it has been on and its transmitter 160 has been on in actual use in the field. The values of the radio-on and transmission-on timers accurately determine how long a particular cellular telephone has been in service in the field, which heretofore was not possible. In case of a component failure in a cellular telephone 100 occurs in the field, the values of the radio-on and transmission-on timers accurately determine how long it has been since that cellular telephone was previously serviced. Then, when the failure is serviced, the values of the radio-on and transmission-on timers can be used to determine the time between failures (e.g. the mean time between failures or MTBF) for that particular cellular telephone and for that particular component. As a result, the reliability of cellular telephone 100 and its components can be more accurately determined than was heretofore possible.

In summary, the radio-on and transmission-on timers of the present invention provide an accurate record of the total amount of time since manufacture that a radio and its transmitter, respectively, have been turned on for the purpose of measuring the in-field reliability thereof. As a result, the quality of the radio may be significantly enhanced using the accurate measurement of the in-field reliability of a radio and its transmitter obtained by the present invention. The unique radio-on and transmission-on timers of the present invention may be advantageously utilized in any radio including a transmitter.

We claim:

1. Timing apparatus for a radio switchably coupled to a battery and including a radio frequency (RF) signal transmitter, comprising:
    means for repetitively generating an interrupt signal at a predetermined rate;
    volatile memory means;
    non-volatile memory means;
    processing means coupled to the RF signal transmitter for generating a transmitter key signal to turn the RF signal transmitter on, and coupled to the battery for sensing when the battery is switched to and from the radio; when said battery is switched to the radio, said processing means responsive to the interrupt signal for incrementing and storing an interrupt timer in said volatile memory means, incrementing and storing a radio-on timer in said volatile memory means, and incrementing and storing a transmission-on timer in said volatile memory means when the transmitter key signal is generated; and when the battery is switched from the radio, said processing means reading out from the volatile memory means the radio-on timer and transmission-on timer, reading out from the non-volatile memory means a previously stored radio-on timer and transmission-on timer, adding the radio-on timer and transmission-on timer read out from the volatile memory means to the previously stored radio-on timer and transmission-on timer, respectively, read out from the non-volatile memory means, and storing the summed radio-on timer and transmission-on timer in said non-volatile memory means.

2. The timing apparatus according to claim 1, further adapted to be coupled to test equipment means, said test equipment means being coupled to said non-volatile memory means for reading out the radio-on timer and transmission-on timer.

3. A method of determining the time of operation of a radio and a radio frequency (RF) signal transmitter thereof, said radio switchably coupled to a battery and including volatile memory means and non-volatile memory means, said method comprising the steps of:
    sensing when the battery is switched to and from the radio;
    when said battery is switched to the radio:
        generating a transmitter key signal to turn the RF signal transmitter on;
        repetitively generating an interrupt signal at a predetermined rate;
        incrementing and storing an interrupt timer in the volatile memory means in response to the interrupt signal;
        incrementing and storing a radio-on timer in the volatile memory means in response to the interrupt signal; and
        incrementing and storing a transmission-on timer in the volatile memory means in response to the interrupt signal when the transmitter key signal is generated; and
    when said battery is switched from the radio:
        reading out from the volatile memory means the radio-on timer and transmission-on timer;
        reading out from the non-volatile memory means a previously stored radio-on timer and transmission-on timer;
        adding the radio-on timer and transmission-on timer read out from the volatile memory means to the previously stored radio-on timer and transmission-on timer, respectively, read out from the non-volatile memory means; and
        storing the summed radio-on timer and transmission-on timer in said non-volatile memory means.

4. The method according to claim 3, wherein said radio is further adapted to be coupled to test equipment means, said method further including the steps of coupling the test equipment means to the non-volatile memory means and reading out the radio-on timer and transmission-on timer.

* * * * *